US012480705B2

(12) United States Patent
Dong et al.

(10) Patent No.: US 12,480,705 B2
(45) Date of Patent: Nov. 25, 2025

(54) REFRIGERATOR

(71) Applicant: LG ELECTRONICS INC., Seoul (KR)

(72) Inventors: Yongwon Dong, Seoul (KR); Younseok Lee, Seoul (KR); Sanggyun Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 251 days.

(21) Appl. No.: 18/267,369

(22) PCT Filed: Dec. 9, 2021

(86) PCT No.: PCT/KR2021/018646
§ 371 (c)(1),
(2) Date: Jun. 14, 2023

(87) PCT Pub. No.: WO2022/131678
PCT Pub. Date: Jun. 23, 2022

(65) Prior Publication Data

US 2024/0044570 A1 Feb. 8, 2024

(30) Foreign Application Priority Data

Dec. 15, 2020 (KR) ........................ 10-2020-0175402

(51) Int. Cl.

| | |
|---|---|
| ***F25D 23/02*** | (2006.01) |
| ***E05D 7/081*** | (2006.01) |
| ***E05F 3/20*** | (2006.01) |

(52) U.S. Cl.
CPC ........... *F25D 23/028* (2013.01); *E05D 7/081* (2013.01); *E05F 3/20* (2013.01); *F25D 23/025* (2013.01);
(Continued)

(58) Field of Classification Search
CPC ............. F25D 23/025; F25D 2323/024; F25D 2400/40; F25D 23/028; F25D 2323/023;
(Continued)

(56) References Cited

U.S. PATENT DOCUMENTS 5,689,855 A * 11/1997 Tang ..................... E05D 7/0054 16/242
8,388,078 B2 3/2013 Kwon et al.
(Continued)

FOREIGN PATENT DOCUMENTS

CN 102252484 A * 11/2011
CN 105546911 A * 5/2016
(Continued)

OTHER PUBLICATIONS

CN108061423 A1 translation (Year: 2018).*
(Continued)

*Primary Examiner* — Hiwot E Tefera
(74) *Attorney, Agent, or Firm* — KED & ASSOCIATES, LLP

(57) ABSTRACT

A refrigerator according to the present embodiment comprises: a cabinet having storage spaces; a main door, which can rotate with respect to the cabinet and opens/closes the storage spaces; a sub door rotating with respect to the main door; and a hinge device, which is fixed to the front surface of the cabinet, supports the lower sides of the main door and the sub door and provides the center of rotation of the main door and the center of rotation of the sub door, wherein the center of rotation of the main door and the center of rotation of the sub door can be positioned on the sub door.

20 Claims, 12 Drawing Sheets

(52) U.S. Cl.
CPC ..... *E05Y 2900/31* (2013.01); *F25D 2323/023* (2013.01); *F25D 2323/024* (2013.01)

(58) Field of Classification Search
CPC ........... E05Y 2900/31; E05Y 2600/626; E05Y 2900/302; E05D 7/081; E05D 11/0054; E05D 11/0081; E05F 3/20
See application file for complete search history.

(56) References Cited

U.S. PATENT DOCUMENTS

| | | | | |
|---|---|---|---|---|
| 10,492,629 | B1 * | 12/2019 | Cunningham | A47F 3/0434 |
| 2005/0077255 | A1 * | 4/2005 | Schluter | E05D 5/14 211/26 |
| 2010/0307188 | A1 | 12/2010 | Kwon | |
| 2011/0023528 | A1 * | 2/2011 | Kwon | F25D 23/028 62/449 |
| 2012/0286639 | A1 * | 11/2012 | Lee | F25D 23/00 312/405.1 |
| 2013/0264930 | A1 * | 10/2013 | Kim | E05F 1/00 312/405 |
| 2014/0132144 | A1 * | 5/2014 | Kim | E05D 11/0081 312/405 |
| 2015/0059126 | A1 * | 3/2015 | Dubina | E05D 11/06 16/319 |
| 2016/0123654 | A1 * | 5/2016 | Lee | E05D 5/02 312/405 |
| 2017/0176089 | A1 * | 6/2017 | Ramm | E05D 7/0027 |
| 2017/0191736 | A1 * | 7/2017 | Fleig | F25D 23/028 |
| 2018/0031302 | A1 | 2/2018 | Park | |
| 2018/0149420 | A1 | 5/2018 | Lee | |
| 2018/0310726 | A1 | 11/2018 | Oh | |
| 2019/0257571 | A1 | 8/2019 | Park | |
| 2020/0025438 | A1 * | 1/2020 | Liu | F25D 23/025 |
| 2021/0396455 | A1 | 12/2021 | Jang | |
| 2023/0114849 | A1 * | 4/2023 | Hunter | F25D 23/028 49/381 |

FOREIGN PATENT DOCUMENTS

| | | | | |
|---|---|---|---|---|
| CN | 108061423 | A * | 5/2018 | F25D 23/028 |
| CN | 110874882 | | 3/2020 | |
| EP | 3001125 | A1 * | 3/2016 | F25C 1/00 |
| EP | 3396282 | | 10/2018 | |
| JP | S63-142682 | | 9/1988 | |
| JP | 2004-211977 | | 7/2004 | |
| KR | 20-1999-0011033 | | 3/1999 | |
| KR | 20-2000-0007478 | | 4/2000 | |
| KR | 10-2006-0062664 | | 6/2006 | |
| KR | 10-2014-0060430 | | 5/2014 | |
| KR | 10-2016-0023741 | | 3/2016 | |
| KR | 20160035532 | A * | 3/2016 | |
| KR | 10-2018-0024352 | | 3/2018 | |
| KR | 10-2018-0080032 | | 7/2018 | |
| KR | 10-2018-0080092 | | 7/2018 | |
| KR | 10-2018-0120005 | | 11/2018 | |
| KR | 20210102539 | A * | 8/2021 | |
| WO | WO 01/71264 | | 9/2001 | |
| WO | WO 2010/010093 | | 1/2010 | |
| WO | WO 2020/043138 | | 3/2020 | |

OTHER PUBLICATIONS

Extended European Search Report dated Sep. 17, 2024 issued in Application No. 21906981.2.
Extended European Search Report dated Sep. 17, 2024 issued in Application No. 21906983.8.
International Search Report dated Mar. 17, 2022 issued in Application No. PCT/KR2021/018646.
International Search Report dated Mar. 17, 2022 issued in Application No. PCT/KR2021/018643.
International Search Report dated Mar. 23, 2022 issued in Application No. PCT/KR2021/018649.
Extended European Search Report dated Sep. 17, 2024 issued in Application No. 21906982.0.
U.S. Office Action dated Sep. 23, 2024 issued in U.S. Appl. No. 18/267,386.
U.S. Office Action dated Sep. 23, 2024 issued in U.S. Appl. No. 18/267,341.

* cited by examiner

REFRIGERATOR

CROSS-REFERENCE TO RELATED PATENT APPLICATIONS

This application is a U.S. National Stage Application under 35 U.S.C. § 371 of PCT Application No. PCT/KR2021/018646, filed Dec. 9, 2021, which claims priority to Korean Patent Application No. 10-2020-0175402, filed Dec. 15, 2020, whose entire disclosures are hereby incorporated by reference.

TECHNICAL FIELD

The present embodiment relates to a refrigerator.

BACKGROUND ART

In general, a refrigerator is a home appliance that stores food at a low temperature in a storage space of an interior shielded by a refrigerator door, and the refrigerator is configured to keep the stored food in an optimal condition by cooling the inside of the storage space using cold air generated through heat exchange with a refrigerant circulating in the refrigeration cycle.

The refrigerator may be independently placed in a kitchen, a living room, or the like, or may be stored in a furniture closet of a kitchen.

Refrigerators are gradually becoming larger and more multi-functional in accordance with changes in eating habits and the trend of high quality products, and refrigerators equipped with various structures and convenient devices considering user convenience are being released.

In Korean Patent Publication No. 10-2014-0060430, which is a prior document, a refrigerator is disclosed.

The refrigerator includes a main body, a storage chamber provided inside the main body so that the front surface is open and including a refrigerating chamber and a freezing chamber, an inner door provided with an opening corresponding to the size of the refrigerating chamber to open and close the refrigerating chamber, and having a plurality of door guards provided in the opening, and an outer door for opening and closing the opening.

In addition, the refrigerator includes a first coupling portion coupled to an upper portion of the main body, a first upper hinge including a first extension portion extending toward the inner door from the first coupling portion and rotatably coupled to the inner door by an upper hinge shaft, a second coupling portion coupled to an upper portion of the outer door, and a second upper hinge including a second extension portion extending toward the inner door from the second coupling portion and rotatably coupled to the upper hinge shaft coupled to the first upper hinge.

In the case of the prior document, since the upper hinge shaft and the lower hinge shaft are coupled to the inner door, when the inner door is opened while the refrigerator is located inside the furniture closet, there is a disadvantage in that in the process of opening the inner door, the outer door interferes with the furniture closet, so that the inner door cannot be opened by 90 degrees or more.

Even if the thickness of the door including the inner door and the outer door is reduced in the prior document, as long as the upper hinge shaft and the lower hinge shaft are configured to be coupled to the inner door, there is a limit to increasing the door opening angle of the inner door.

In addition, in the case of the prior document, since the upper hinge shaft is configured to pass through the second extension portion of the second upper hinge connected to the outer door and the insertion tube located inside the inner door at the same time, there is a disadvantage in that the length of the upper hinge shaft becomes longer, and thus the space for assembling the doors must be large. In addition, since the upper hinge shaft must pass through the insertion tube and the second extension portion at the same time, there is a disadvantage in that operator's work convenience is reduced.

DISCLOSURE

Technical Problem

The present embodiment provides a refrigerator in which the opening angle of a door can be increased even when the refrigerator is located in a furniture closet.

Optionally or additionally, the present embodiment provides a refrigerator capable of securing a door opening angle while reducing the thickness of the door.

Optionally or additionally, the present embodiment provides a refrigerator in which a hinge mechanism for rotating a door and a door are easily assembled.

Optionally or additionally, the present embodiment provides a refrigerator capable of stably closing the door by providing a closing force to the door when the door is closed.

Technical Solution

A refrigerator according to an aspect may include a cabinet having a storage space; a main door rotatable with respect to the cabinet and opening and closing the storage space; a sub door rotatable with respect to the main door; and a hinge mechanism fixed to the cabinet, supporting the main door and the sub door, and providing a rotation center of the main door and a rotation center of the sub door.

The hinge mechanism may be fixed to a front surface of the cabinet. The hinge mechanism may support lower sides of the main door and the sub door.

The rotation center of the main door and the rotation center of the sub door may be located on the sub door.

The rotation center of the main door may coincide with the rotation center of the sub door. The rotation center of the main door and the rotation center of the sub door may extend from the sub door in a vertical direction.

The refrigerator may further include an auto closing device installed on the main door and providing a closing force to the main door during a closing of the main door.

The auto closing device may include a body installed in the main door, an elastic member accommodated in the body, and a lever connected to the elastic member and rotating with respect to the body about a rotation center. The elastic member may be, for example, a torsion spring.

The hinge mechanism may include a hinge bracket fixed to the cabinet and having a contact surface in contact with the lever.

When the main door is closed, the rotation center of the main door may be located closer to the front surface of the sub door than the rotation center of the lever.

When the main door is closed, the contact portion of the lever contacting the contact surface may be located closer to the rear surface of the main door than the rotation center of the lever. The contact portion may be a roller rotatably coupled to an end portion of the lever.

The sum of the thicknesses of the main door and the sub door may be smaller than a distance between a rotation center of the main door and a rotation center of the lever in a closed state of the main door and the sub door.

The hinge mechanism may include a hinge bracket fixed to the cabinet. The hinge mechanism may further include a first hinge pin coupled to the hinge bracket and providing a rotation center of the main door.

The hinge mechanism may further include a fixing bracket coupled to the main door. The hinge mechanism may further include a second hinge pin coupled to the fixing bracket and providing a rotation center of the sub door.

The first hinge pin and the second hinge pin may be aligned in a vertical direction in a state in which the second hinge pin is located above the first hinge pin.

A portion of the first hinge pin may be accommodated inside the second hinge pin.

The hinge bracket may include a first opening to which the first hinge pin is coupled. The fixing bracket includes a second opening to which the second hinge pin is coupled.

The first opening and the second opening may be aligned in a vertical direction.

The second opening of the fixing bracket may be spaced apart from the first opening of the hinge bracket in an upward direction.

The hinge mechanism may further include a first bushing rotatable with respect to the first hinge pin. The hinge mechanism may further include a second bushing relatively rotatable with respect to the second hinge pin.

The first hinge pin may include a first shaft accommodated in the first bushing.

The second hinge pin may include a second shaft and a pin body extending downward from the second shaft. The first bushing may be accommodated and fixed in the pin body. At least a portion of the first shaft may be located in the pin body in a state of being accommodated in the first bushing.

The second bushing may include an upper body accommodating the second shaft and a lower body accommodating the pin body.

The sub door may include a hinge coupling portion for accommodating the second bushing.

The second bushing may be accommodated in the hinge coupling portion. At least a portion of the second hinge pin is located in the hinge coupling portion in a state in which the second hinge pin is accommodated in the second bushing.

At least a portion of the first hinge pin may be located inside the second hinge pin and inside the hinge coupling portion.

The second bushing may be fixed to the sub door. The first bushing may be fixed to the second hinge pin.

When the main door rotates, the fixing bracket, the second bushing, the second hinge pin, and the first bushing may rotate together. The first bushing may relatively rotate with respect to the first hinge pin.

When the sub door rotates, the second bushing may rotate together. When the sub door rotates, the second bushing may relatively rotate with respect to the second hinge pin.

The hinge bracket may include a coupling portion to be coupled to the front surface of the cabinet. The hinge bracket may further include a bracket body extending from the coupling portion in a horizontal direction and to which the first hinge pin is coupled.

The bracket body may include a first stopping portion and a second stopping portion spaced apart from each other in a horizontal direction.

The sub door may include a stopper contacting the first stopping portion or the second stopping portion during rotation of the sub door.

The stopper may contact the first stopping portion in a state of closing the sub door. The stopper may contact the second stopping portion while the sub door is opened.

The fixing bracket may include a door coupling bracket fixed to the main door and extending in a vertical direction. The fixing bracket may further include an extension bracket extending to be inclined at a predetermined angle in a horizontal direction from the door coupling bracket. The fixing bracket may further include a support bracket extending in a horizontal direction forward from the extension bracket and to which the second hinge pin is coupled.

The door coupling bracket may include a plurality of fastening holes spaced apart from each other in a vertical direction.

Advantageous Effect

According to the present embodiment, even if the refrigerator is located inside the furniture closet, the opening angle of the door can be increased.

According to the present embodiment, the door opening angle can be secured while reducing the thickness of the door.

The present embodiment has the advantage of easy assembly of the hinge mechanism for rotating the door and the door.

BEST MODE

Figure 1:
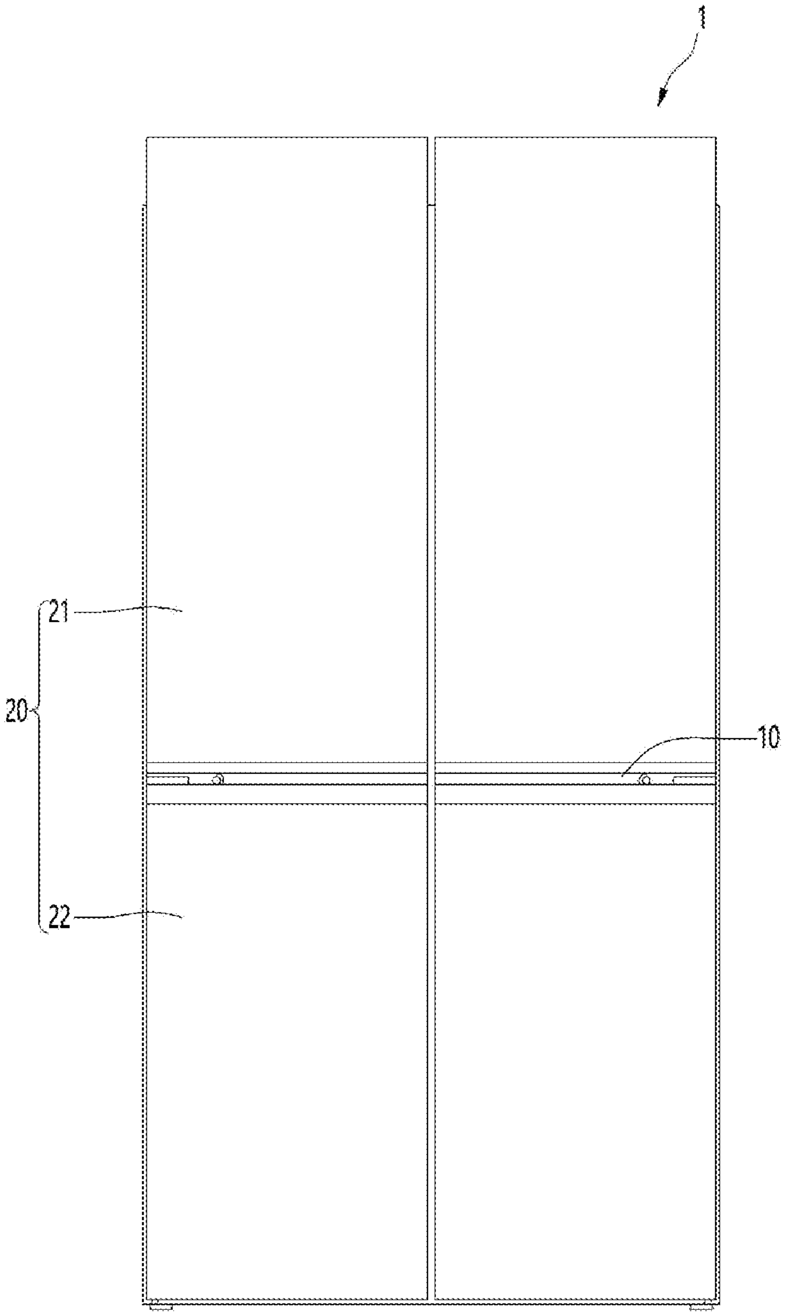
FIG. 1 is a front view illustrating a refrigerator according to the present embodiment.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
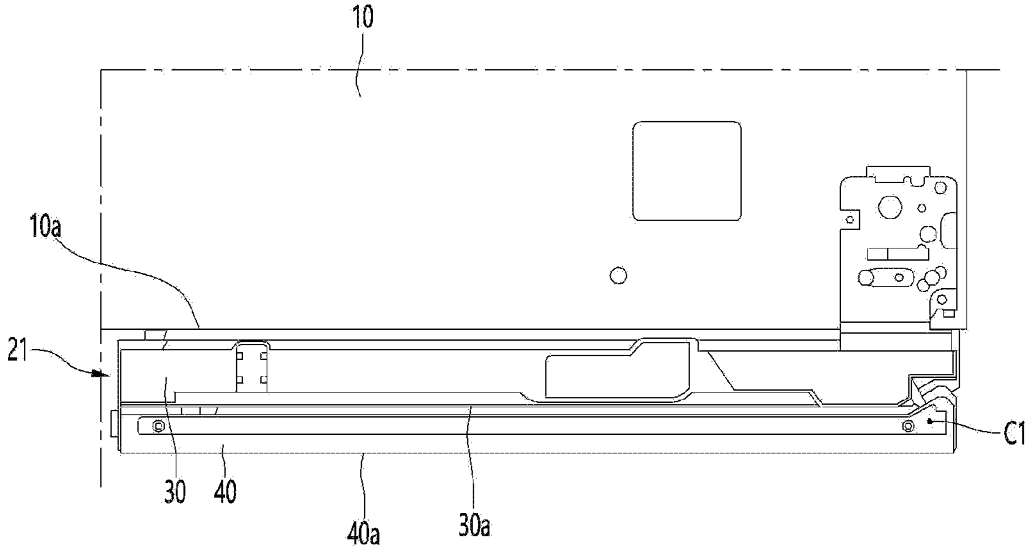
FIG. 2 is a view illustrating a portion of a plan view of the refrigerator according to the present embodiment.
Figure 3:
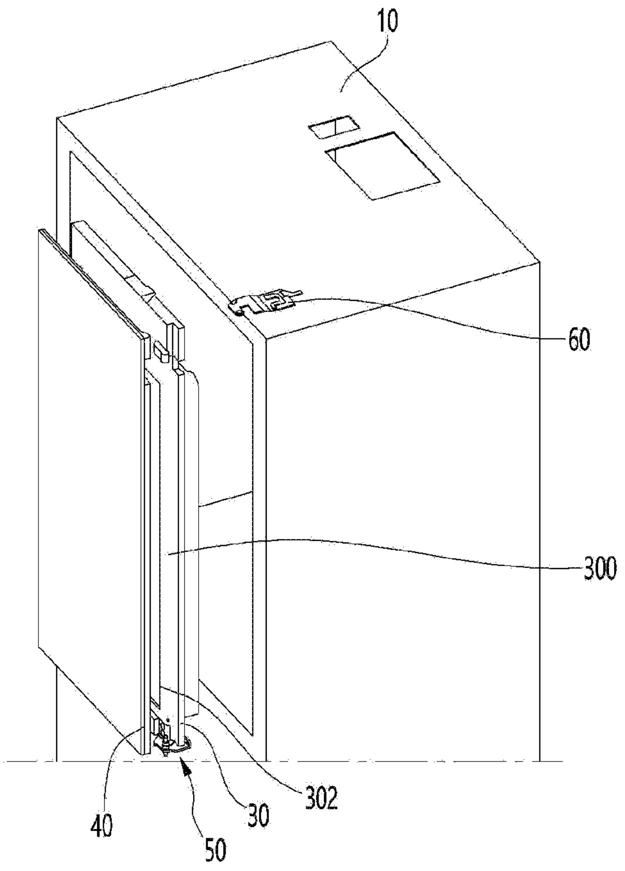
FIG. 3 is a view illustrating a state where one door of the present embodiment is separated.
Figure 4:
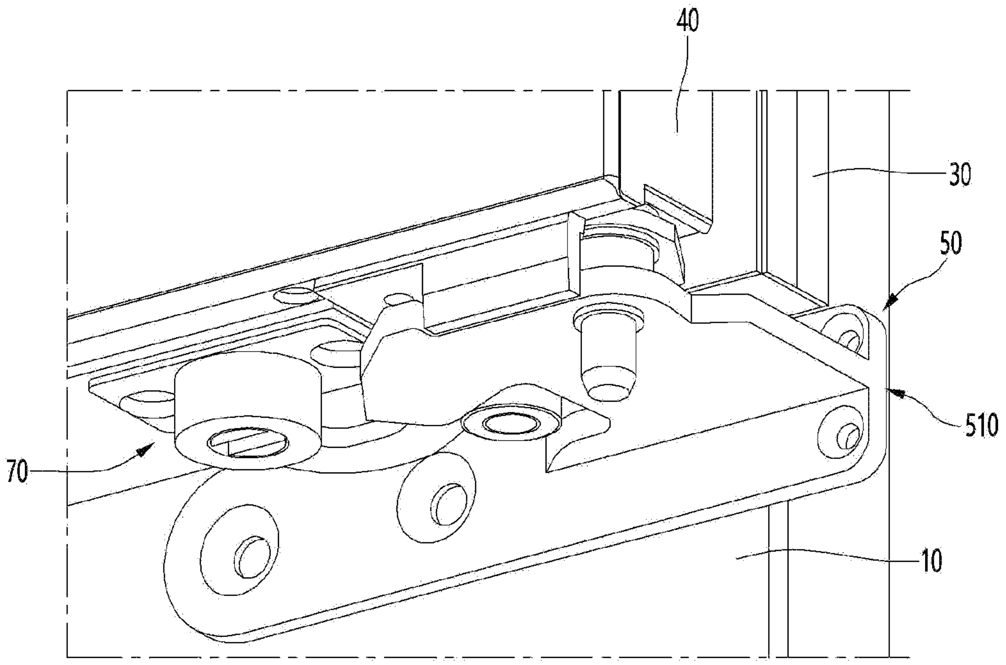
FIG. 4 is a view illustrating a state where a hinge mechanism is coupled to a door of the present embodiment.

FIG. 1 is a front view illustrating a refrigerator according to the present embodiment, FIG. 2 is a view illustrating a portion of a plan view of the refrigerator according to the present embodiment, FIG. 3 is a view illustrating a state where one door of the present embodiment is separated, and FIG. 4 is a view illustrating a state where a hinge mechanism is coupled to a door of the present embodiment.

Referring to FIGS. 1 to 4, the refrigerator 1 according to the present embodiment may be installed independently in a kitchen or installed in a state of being accommodated in an indoor furniture closet. When the refrigerator 1 is installed in the indoor furniture closet, the refrigerator 1 may be installed alone or arranged side by side with other refrigerators.

The refrigerator 1 may include a cabinet 10 having a storage space and a refrigerator door 20 opening and closing the storage space.

The storage space is not limited, but may be divided into an upper first space and a lower second space, and the refrigerator door 20 also may include a first door 21 opening and closing the first space and the second door 22 opening and closing the second space.

The first space may be a refrigerating chamber, and the second space may be a freezing chamber or vice versa. Alternatively, it is also possible that the storage space includes a first space and a second space divided into left and right sides. Alternatively, the storage space may be a single space, and a single refrigerator door may open and close the storage space.

At least one of the first door 21 and the second door 22 may be a rotation type door. Alternatively, the single refrigerator door 20 may be a rotation type door.

In the present embodiment, a state where the two first doors 21 are disposed in the left and right direction will be described as an example. In addition, in the present embodiment, a state where the first door on the right side including the main door 30 and the sub door 40 will be described as an example. Of course, it is also possible that the first door 21 on the left side includes the main door 30 and the sub door 40.

Hereinafter, the first door including the main door 30 and the sub door 40 will be referred to as "door 21" for convenience of description.

The main door 30 is rotatably connected to the cabinet 10 by a hinge mechanism 50 and can open and close the storage space.

The main door 30 may include a door frame 300 having an opening 302. The door frame 300 may form an outer appearance of the main door 30. The opening 302 of the door frame 300 may communicate with the storage space. A door storage portion such as a basket may be additionally provided at the opening 302 of the door frame 300 or at the rear side of the door frame 300.

The sub door 40 may open and close the opening 302 of the main door 30. For example, the sub door 40 may open the opening 302 while the main door 30 is closed. Alternatively, the main door 30 may be opened together with the sub door 40 in a state in which the opening 302 of the main door 30 is closed by the sub door 40.

The sub door 40 may open and close the opening 302 in front of the main door 30. In other words, as illustrated in FIG. 2, the front surface 40*a* of the sub door 40 may be located in front of the front surface 30*a* of the main door 30. The distance between the front surface 40*a* of the sub door 40 and the front surface 10*a* of the cabinet 10 may be longer than the distance between the front surface 30*a* of the main door 30 and the front surface 10*a* of the cabinet 10.

The sub door 40 may be connected to the hinge mechanism 50. The sub door 40 can rotate with respect to the cabinet 10 and the main door 30 by the hinge mechanism 50.

The hinge mechanism 50 may provide the rotation center C1 of the main door 30 as well as the rotation center C1 of the sub door 30. The rotation center C1 may be located at the sub door 40. For example, the rotation center C1 may extend from the sub door 30 in the vertical direction. The rotation center C1 may be located in front of the front surface 30*a* of the main door 30.

The rotation center C1 of the main door 30 may coincide with the rotation center C1 of the sub door 30. In other words, the main door 30 and the sub door 30 may have the same rotation center C1.

For example, the hinge mechanism 50 may be connected to the lower side of the door 21. An additional hinge mechanism 60 may be provided on the upper side of the door 21 so that the door 21 rotates smoothly. The additional hinge mechanism 60 may also provide the rotation center C1 of the main door 30 and the rotation center C1 of the sub door 30.

The hinge mechanism 50 may be fixed to the cabinet 10. The hinge mechanism 50 may include a hinge bracket 510. A portion of the hinge bracket 510 may be fixed to the front surface 10*a* of the cabinet 10. While the hinge bracket 510 is fixed to the front surface 10*a* of the cabinet 10, another portion of the hinge bracket 510 may extend forward from the front surface 10*a* of the cabinet 10.

Another portion of the hinge bracket 510 may cross the lower side of the main door 30 and extend toward the sub door 40. For example, the lower surface of the main door 30 may be located higher than a portion extending forward from the hinge bracket 510.

A detailed structure of the hinge mechanism 50 will be described later with reference to the drawings.

The door 21 may further include an auto closing device 70 that provides a closing force to the door 21 when the door 21 is closed.

The auto closing device 70 may provide a closing force to the door 21 in the process of closing the door 21 while interacting with the hinge bracket 510. Although not limited, the auto closing device 70 may be installed on the main door 30 to provide a closing force to the main door 30.

Figure 5:
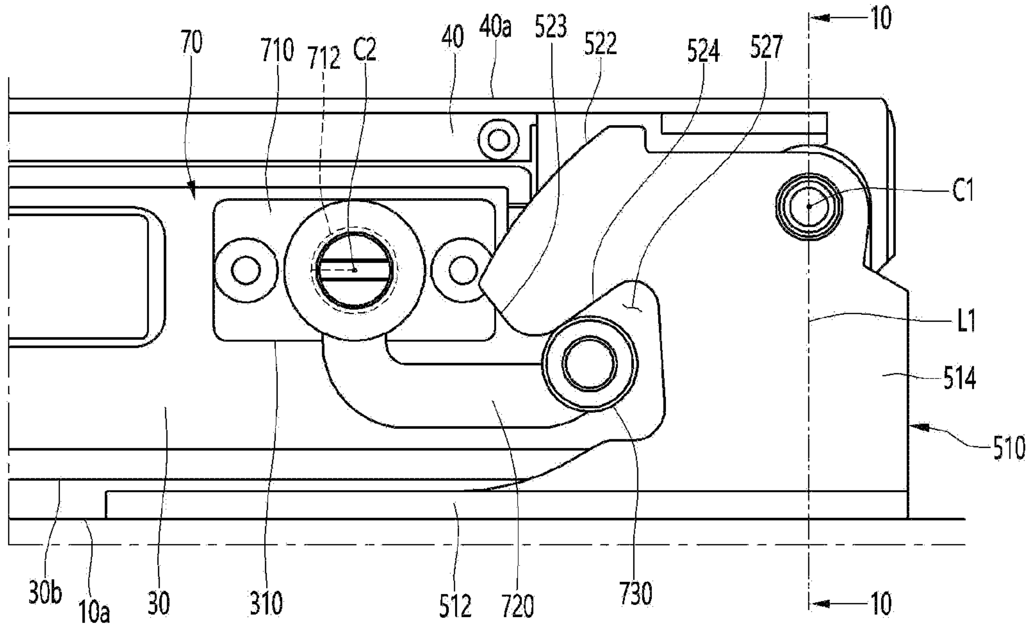
FIG. 5 is a bottom view illustrating a door installed in a hinge mechanism.

FIG. 5 is a bottom view illustrating a door installed in a hinge mechanism.

Referring to FIG. 5, the hinge bracket 510 may include a coupling portion 512 to be coupled to the cabinet 10.

The hinge bracket 510 may further include a bracket body 514 extending in a horizontal direction from the coupling portion 512.

The coupling portion 512 may be coupled to the cabinet 10 by a fastening member.

The bracket body 514 may be located lower than lower surfaces of the main door 30 and the sub door 40.

The rotation center C1 may be located on the bracket body 514.

The main door 30 may include an accommodation portion 310 in which the auto closing device 70 is accommodated. The accommodation portion 310 may be formed as the lower surface of the main door 30 is recessed upward.

The auto closing device 70 may include a body 710, an elastic member 712 accommodated in the body 710, and a lever 720 connected to the elastic member 712.

The elastic member 712 may be, for example, a torsion spring. The elastic member 712 may be formed by winding a wire multiple times. An upper end of the elastic member 712 may be fixed to the body 710, and a lower end of the elastic member 712 may be connected to the lever 720 directly or by a connecting member.

The lever 720 is rotatable, and the elastic member 712 can be elastically deformed by rotation of the lever 720.

The main door 30 may be opened by rotating in a clockwise direction based on FIG. 5. When the main door 30 rotates counterclockwise and closed, the elastic force of the elastic member 712 is transmitted to the lever 720, and the interaction between the lever 720 and the hinge bracket 510 causes the main door to be smoothly closed.

The rotation center C2 of the lever 720 may be located on the body 710. A roller 730 rotatable by a shaft may be provided at an end portion of the lever 720. The roller 730 may be in contact with the bracket body 514. Therefore, the roller 730 may be referred to as a contact portion.

The bracket body 514 may include a contact surface in contact with the contact portion of the lever 720. For example, the roller 730 of the lever 720 may be in contact with the contact surface.

In the process of moving the lever 720 along the contact surface, the lever 720 may rotate based on the rotation center C2.

The contact surface may include a first surface 522 that the lever 720 initially contacts while the door 21 (for example, the main door 30) is closed. In a state in which the door 21 is opened at a predetermined angle or more, the lever 720 does not contact the first surface 522, and in the process of closing the door 21, the lever 720 is in contact with the first surface 522.

The first surface 522 may not be only disposed to be inclined with the front surface 10*a* of the cabinet 10, but also may be disposed arranged so as to be inclined with the imaginary line L1 perpendicular to the front surface 10*a* of the cabinet 10 while passing through the rotation center C1 of the door 21.

The first surface 522 may be inclined in a direction away from the rotation center C1 as it approaches the front surface 10*a* of the cabinet 10.

The contact surface may further include a second surface 523 extending from the first surface 522. The second surface 523 may be inclined with respect to the first surface 522.

The second surface 523 may be inclined in a direction closer to the imaginary line L1 as it approaches the front surface 10*a* of the cabinet 10.

The contact surface may further include a third surface 524 extending from the second surface 523. The third surface 524 may be inclined with respect to the second surface 523.

The third surface 524 may be inclined not only with the front surface 10*a* of the cabinet 10 but also with the imaginary line L1. The third surface 524 extends in a direction closer to the imaginary line L1 as the distance from the front surface 10*a* of the cabinet 10 increases.

The bracket body 514 may further include an accommodation groove 527 for accommodating a portion of the lever 720, that is, a roller 730. In other words, in a state in which the door 21 is closed, the roller 730 may be located in the receiving groove 527 and be in contact with the third surface 524.

In a state in which the door 21 is closed, the rotation center C1 of the door 21 may be located closer to the front surface 40*a* of the sub door 40 than to the rear surface 30*b* of the main door 30.

The distance between the rotation center C1 of the door 21 and the rear surface 30*b* of the main door 30 may be twice or more the distance between the rotation center C1 of the door 21 and the front surface 40*a* of the sub door 40.

In a state in which the door 21 is closed, the distance between the rotation center C1 of the door 21 and one side of the sub door 40 may be smaller than the distance between the rotation center C1 of the door 21 and the rear surfaces 30*b* of the main door 30.

In a state in which the door 21 is closed, the rotation center C1 of the door 21 may be located closer to the front surface 40*a* of the sub door 40 than the rotation center C2 of the lever 720.

The rotation centers C1 of the main door 30 and the sub door 40 may be located on the sub door 40, and the rotation center C2 of the lever 720 may be located on the main door 30.

In a state in which the door 21 is closed, the rotation center C1 of the door 21 may be farther from the rear surface 30*b* of the main door 30 than the rotation center C2 of the lever 720.

The thickness of the door 21 (the sum of the thicknesses of the main door and the sub door) may be smaller than the distance between the rotation center C1 of the door 21 and the rotation center C2 of the lever 720 in the state where the door 21 is closed (the state where the main door and the sub door are closed).

In a state in which the door 21 is closed, the roller 730 of the lever 720 may be located closer to the rear surface 30*b* of the main door 30 than to the rotation center C2 of the lever 720.

In a state in which the door 21 is closed, a portion of the first surface 522 may be located closer to the front surface 40*a* of the sub door 40 than to the rotation center C1 of the door 21.

In a state in which the door 21 is closed, another portion of the first surface 522 may be located closer to the rear surface 30*b* of the main door 30 than to the rotation center C1 of the door 21.

In a state in which the door 21 is closed, the second surface 523 and the third surface 524 may be located to be closer to the rear surface 30*b* of the main door 30 than to the rotation center C1 of the door 21.

Figure 6:
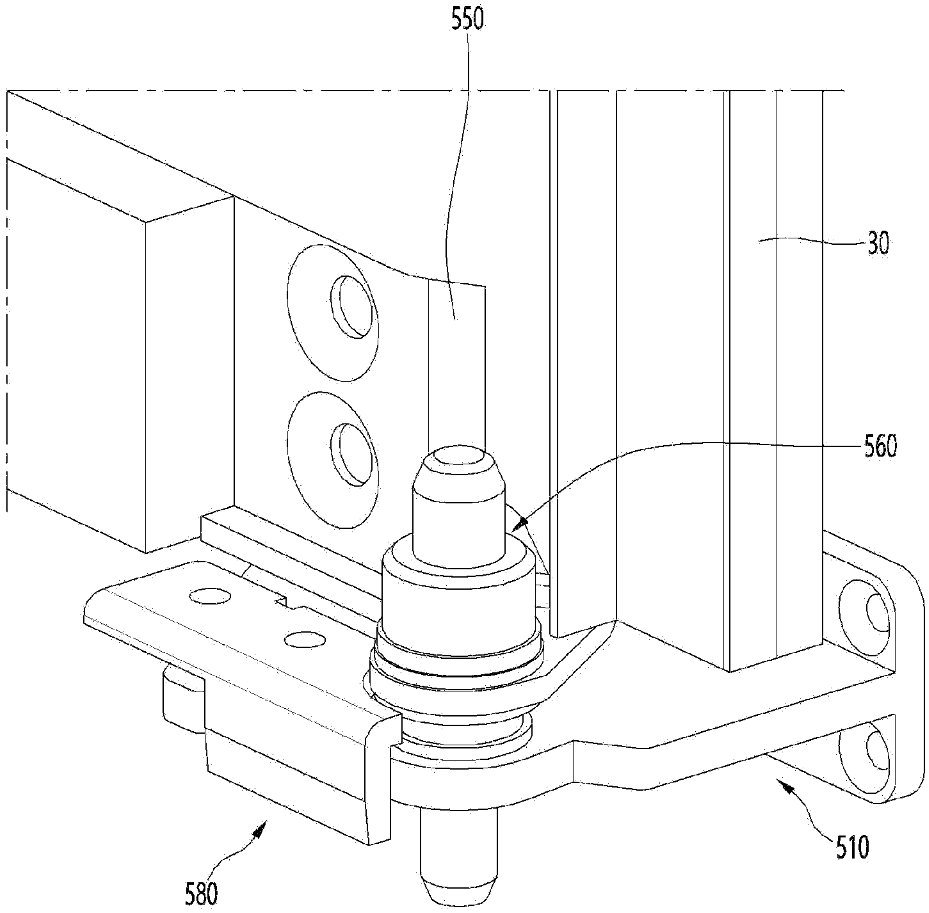
FIG. 6 is a view illustrating a state where some components of the sub door are removed in a state in which the hinge mechanism is connected to the door.
Figure 7:
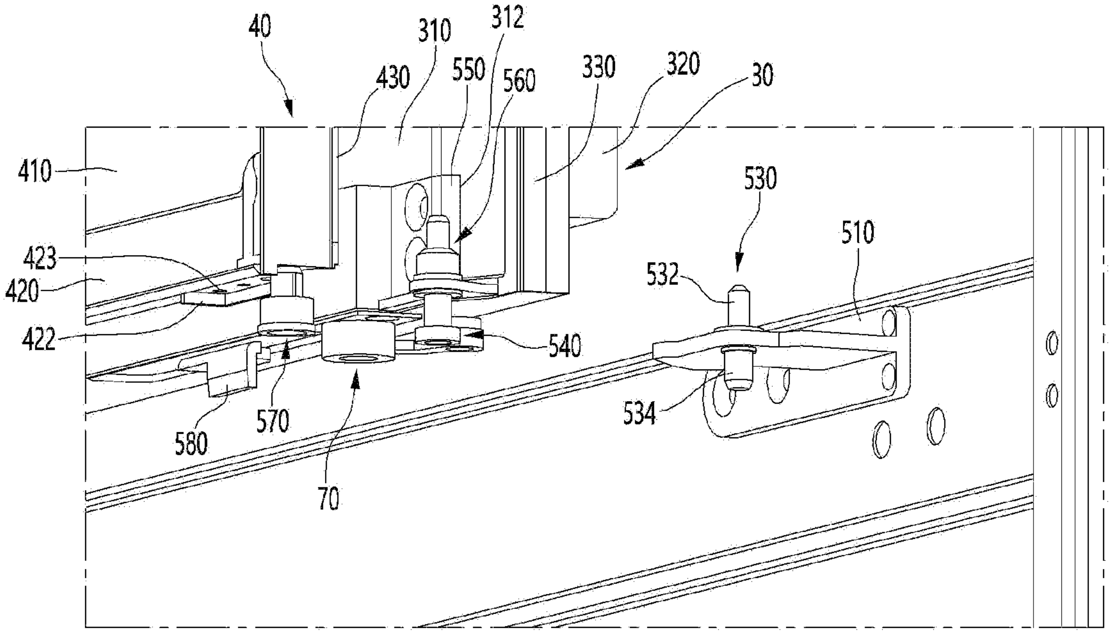
FIG. 7 is a view illustrating a state where the sub door and the main door are separated from the hinge mechanisms.
Figure 8:
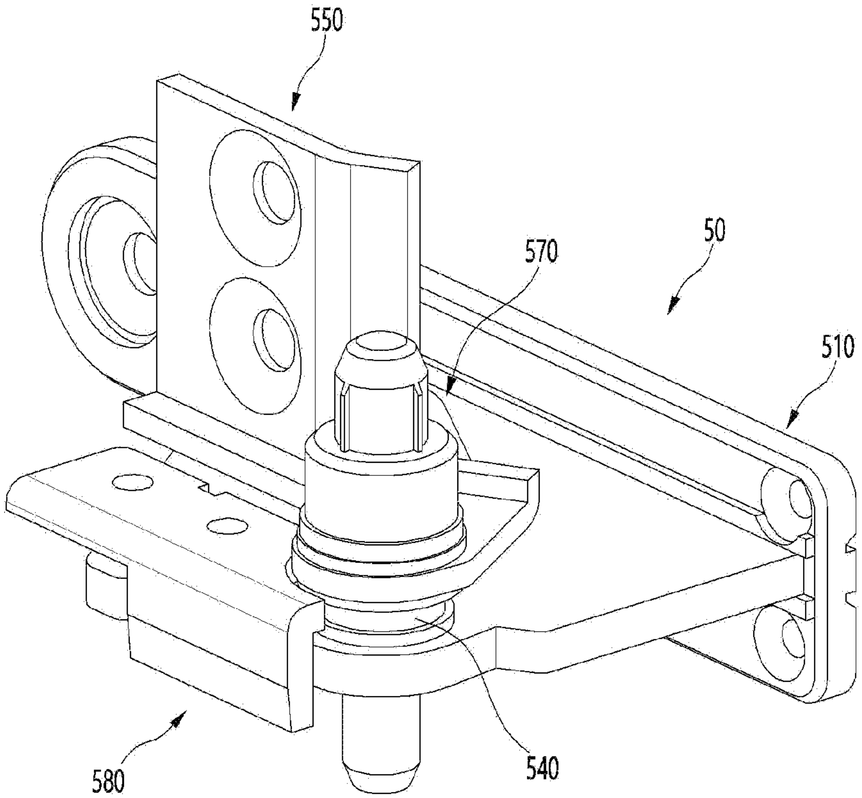
FIG. 8 is a perspective view illustrating the hinge mechanism.
Figure 9:
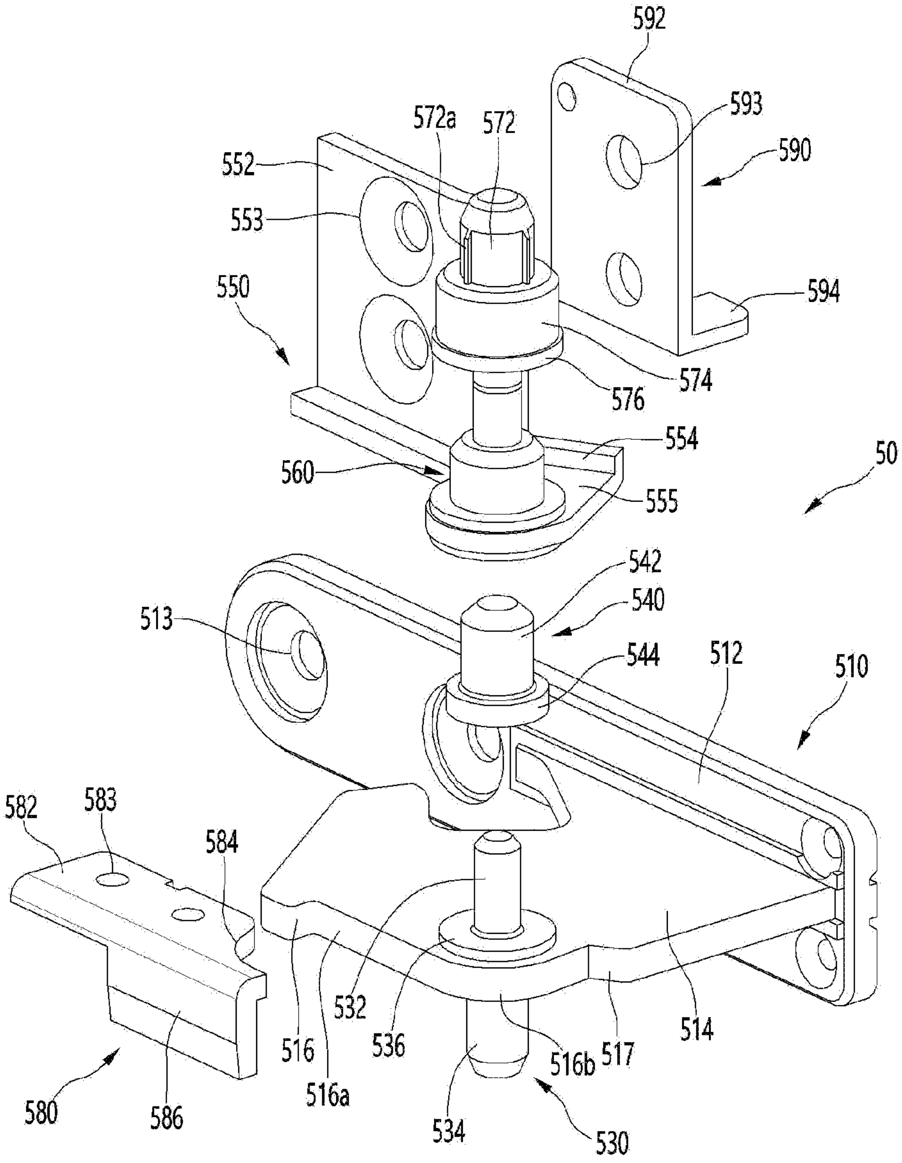
FIG. 9 is an exploded perspective view illustrating the hinge mechanism.
Figure 10:
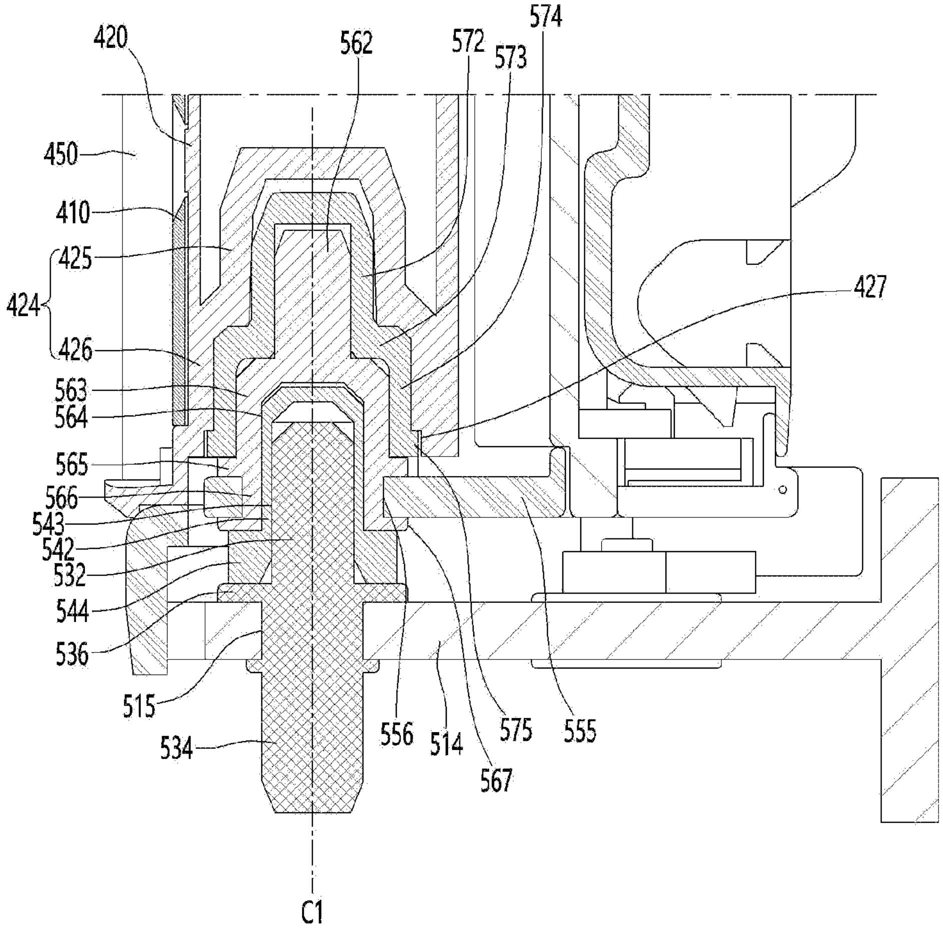
FIG. 10 is a cross-sectional view taken along line 10-10 in FIG. 5.

FIG. 6 is a view illustrating a state where some components of the sub door are removed in a state in which the hinge mechanism is connected to the door, FIG. 7 is a view illustrating a state where the sub door and the main door are separated from the hinge mechanisms, FIG. 8 is a perspective view illustrating the hinge mechanism, FIG. 9 is an exploded perspective view illustrating the hinge mechanism, and FIG. 10 is a cross-sectional view taken along line 10-10 in FIG. 5.

Referring to FIGS. 6 to 10, the hinge bracket 510 may include a coupling portion 512 and the bracket body 514 as described above.

The coupling portion 512 may include one or more fastening holes 513. A fastening member may be coupled to the front surface of the cabinet 10 through the fastening hole 513.

The height of the bracket body 514 may be smaller than the height of the coupling portion 512. The bracket body 514 may extend in a horizontal direction from a position spaced apart from the upper and lower ends of the coupling portion 512. For example, the bracket body 514 may extend from the middle of the coupling portion 512.

The bracket body 514 may include a first stopping portion 516 and a second stopping portion 517 which are spaced apart from each other.

The first stopping portion 516 and the second stopping portion 517 may protrude from a side surface of the bracket body 514. Alternatively, the first stopping portion 516 and the second stopping portion 517 may be portions located at both end portions of the recessed portion as a portion of the side surface of the bracket body 514 is recessed.

The side surface of the bracket body 514 may include a straight portion 516*a* and a curved portion 516*b* located between the first stopping portion 516 and the second stopping portion 517.

A stopper 580 may be coupled to the sub door 40. The stopper 580 may include the first portion 582 and a second portion 586 bent from the first portion 582.

For example, the first portion 582 may be coupled to the lower surface of the sub door 40. The first portion 582 may extend in a horizontal direction.

For example, the second portion 586 may extend downward from one end of the first portion 582.

The first portion 582 may include one or more fastening holes 583 to be fastened to the sub door 40.

The first portion 582 may be located above the bracket body 514 when the door 21 is closed and may be spaced apart from the bracket body 514.

The second portion 586 may be disposed at a position corresponding to the straight portion 516*a* when the door 21 is closed. The second portion 586 may be in contact with or be spaced apart from the straight portion 516*a* at a front side of the straight portion 516*a*.

The second portion 586 may be in contact with the first stopping portion 516 when the door 21 is closed. Additional rotation may be restricted in a direction in which the door 21 is closed in a state in which the second portion 586 is in contact with the first stopping portion 516.

When the second portion 586 is located in front of the straight portion 516*a* with the door 21 closed, the second portion 586 covers a portion of the hinge mechanism 50 and thus the external exposure of the hinge mechanism 50 can be reduced.

When the first portion 582 is coupled to the sub door 40, since the stopper 580 rotates together with the sub door 40, the first portion 582 may include a round portion 584 so that interference with the hinge mechanism 50 is prevented. The round portion 584 may be formed in an arc shape centered on the rotation center C1.

The curved portion 516*b* may be formed in an arc shape centered on the rotation center C1. Accordingly, interference between the second portion 586 and the curved portion 516*b* can be prevented.

In the process of opening the sub door 40 or the main door 30, the second portion 586 may be in contact with the second stopping portion 517. In a state in which the second portion 586 is in contact with the second stopping portion 517, additional rotation in the direction in which the door 21 is opened may be restricted.

In the present embodiment, it is also possible that the stopper 580 is omitted. In this case, the stoppers 516 and 517 interacting with the stopper 580 in the bracket body 514 may also be omitted.

The bracket body 514 may include a first opening 515. The first opening 515 may be formed to pass through the bracket body 514 in a vertical direction. The rotation center C1 may pass through the first opening 515.

The hinge mechanism 50 may further include a first hinge pin 530. The first hinge pin 530 may enable rotation of the main door 30. For example, the first hinge pin 530 may provide a center of rotation of the main door 30.

The first hinge pin 530 may include a first shaft 532. The first shaft 532 may be formed in a cylindrical shape, for example.

The first hinge pin 530 may include a shaft body 534 extending downward from the first shaft 532. The shaft body 534 may pass through the first opening 515.

A diameter of the shaft body 534 may be different from a diameter of the first shaft 532. For example, the diameter of the shaft body 534 may be greater than that of the first shaft 532.

The shaft body 534 may pass through the first opening 515 at an upper side of the bracket body 514.

The first hinge pin 530 may further include a flange 536 extending in a horizontal direction. The flange 536 may be seated on the upper surface of the bracket body 514 in a state in which the shaft body 534 passes through the first opening 515. For example, the flange 536 may be located at a boundary between the first shaft 532 and the shaft body 534.

The shaft body 534 may protrude from the lower surface of the bracket body 515 to provide a rotation center of the second door 22. Of course, it is also possible that the shaft body 534 does not provide the rotation center of the second door 22.

As in the present embodiment, when the first hinge pin 530 is coupled to the hinge bracket 510 as a separate component, assembly by an operator can be improved and the length of the first hinge pin 530 itself can be reduced, and thus there is an advantage that the restrictions of the working space can be reduced.

Since the first hinge pin 530 is fixed to the hinge bracket 510, the main door 30 can rotate around the fixed shaft 532.

The hinge mechanism 50 may further include a first bushing 540 coupled to the first shaft 532.

The first bushing 540 may be rotatably coupled to the first shaft 532. The first shaft 532 may be formed of a metallic material, and the first bushing 540 may be formed of a non-metallic material. Therefore, the first bushing 540 can smoothly rotate with respect to the first shaft 532 by the first bushing 540.

The first bushing 540 may include a first body 542 including a space 543 for accommodating the first shaft 532. The first body 542 may be formed in a cylindrical shape, for example.

The length of the first body 542 in the vertical direction may be equal to or greater than the length of the first shaft 532 in the vertical direction.

The first bushing 540 may further include an extension portion 544 extending in a horizontal direction from the lower end portion of the first body 542. The extension portion 544 may be seated on the flange 536 of the first hinge pin 530.

The hinge mechanism 50 may further include a fixing bracket 550. The fixing bracket 550 may be coupled to the main door 30.

The fixing bracket 550 may include a door coupling bracket 552 fixed to the main door 30. The door coupling bracket 552 may extend in a vertical direction.

The door coupling bracket 552 may include one or more coupling holes 553 for coupling with the main door 30 by a coupling member. FIG. 9 also illustrates that the door coupling bracket 552 includes a plurality of fastening holes 553 as an example. The plurality of fastening holes 553 may be arranged spaced apart in the vertical direction.

The fixing bracket 550 may further include an extension bracket 554 extending horizontally from the door coupling bracket 552. The extension bracket 554 may be extended to be inclined at a predetermined angle with the door coupling bracket 552.

The fixing bracket 550 may further include a support bracket 555 extending horizontally forward from the extension bracket 554.

The fixing bracket 550 may include a second opening 556. The second opening 556 may be formed to pass through the fixing bracket 550 in a vertical direction. The second opening 556 may be aligned with the first opening 515 of the hinge bracket 510 in a vertical direction. Accordingly, the rotation center C1 may pass through the first opening 515 and the second opening 556. For example, the second opening 556 may be formed in the support bracket 555.

The hinge mechanism 50 may further include a second hinge pin 560. The second hinge pin 560 may enable rotation of the sub door 40 with respect to the main door 30. For example, the second hinge pin 560 may provide a rotation center C1 of the sub door 40. At this time, the rotation center C1 of the main door 30 provided by the first hinge pin 530 and the rotation center C1 of the sub door 40 provided by the second hinge pin 560 coincide with each other.

The second hinge pin 560 may include a second shaft 562. The first shaft 562 may be formed in a cylindrical shape, for example.

The second hinge pin 560 may further include a pin body 563 extending upward from the second shaft 562.

The pin body 563 may include an accommodation space 564 for accommodating the first body 542 of the first bushing 540. An inner circumferential surface of the pin body 563 forming the accommodation space 564 may be in contact with an outer circumferential surface of the first bushing 540.

The first bushing 540 may be accommodated in the pin body 563, and the first shaft 532 may be accommodated in the first bushing 540 within the pin body 563.

The first body 542 of the first bushing 540 may be fitted and coupled to the pin body 563. Therefore, the first bushing 540 can rotate with respect to the first shaft 532 in a state of being fixed to the pin body 563 during the rotation of the main door 30.

The second hinge pin 560 may include a coupling body 566 to be coupled to the second opening 556, and a flange 565 seated on the upper surface of the support bracket 555 when the coupling body 566 passes through the second opening 556. The flange 565 may extend from the pin body 563 in the horizontal direction. The coupling body 566 may extend downward from the pin body 563. An outer diameter of the coupling body 566 may be equal to or larger than that of the pin body 563. An outer diameter of the flange 565 is larger than a diameter of the second opening 556.

The outer diameter of the coupling body 566 is equal to or larger than the diameter of the second opening 556, so the coupling body 566 can be fitted into the second opening 556.

The length of the coupling body 566 in the vertical direction is greater than the thickness (a length in the vertical direction) of the support bracket 555. Accordingly, in a state in which the coupling body 566 passes through the second opening 556, a portion of the coupling body 566 may protrude downward from the support bracket 555. As the coupling body 566 protruding downward is pressed by an external force and bent in a horizontal direction, a lower support portion 567 may be formed. As the lower support portion 567 is in contact with the lower surface of the support bracket 555, upward movement of the second hinge pin 560 may be restricted.

When the second hinge pin 560 is coupled to the support bracket 555 as a separate component, the operator's assembling ability can be improved and the length of the second hinge pin 560 itself can be reduced and thus there is an advantage that the restrictions of the working space can be reduced.

In a state in which the first body 542 of the first bushing 540 is accommodated in the pin body 564, the coupling body 566 and the lower support portion 567 may be seated in the extension portion 544 of the first bushing 540.

In the present embodiment, since the first bushing 540 is disposed between the first hinge pin 530 and the second hinge pin 560, even when the first shaft 532 is located inside the second hinge pin 560, direct friction between the first shaft 532 and the second hinge pin 560 can be prevented.

In the present embodiment, since at least a portion of the first shaft 532 is accommodated in the second hinge pin 560, even if the rotation centers C1 of the main door 30 and the sub door 40 coincide with each other, an increase in the height of the hinge mechanism 50 may be minimized.

The hinge mechanism 50 may further include a second bushing 570 coupled to the second hinge pin 560.

The second bushing 570 may be coupled to the second shaft 562 to be relatively rotatable. The second shaft 562 may be formed of a metallic material, and the second bushing 570 may be formed of a non-metallic material. The second bushing 570 can smoothly rotate with respect to the second shaft 562 during the rotation process of the sub door 40 by the second bushing 570.

The second bushing 570 may include an upper body 572 accommodating the second shaft 562 and a lower body 574 accommodating the pin body 563.

The inner diameter of the lower body 574 may be larger than that of the upper body 572. An outer diameter of the lower body 574 may be larger than that of the upper body 572.

An outer surface of the upper body 572 may be provided with a coupling rib **572*a* to be fitted and coupled to the sub door 40. For example, a plurality of coupling ribs 572*a* may be spaced apart from each other along the circumference of the upper body 572. Each coupling rib 572*a* may extend in a vertical direction of the upper body 572**.

Due to the difference in diameter between the upper body 572 and the lower body 574, the second bushing 570 may include a stepped surface 576. The stepped surface 576 may be seated on the pin body 563. The second bushing 570 may further include a flange 575 extending in a horizontal direction from the lower end of the lower body 574.

When the second hinge pin 560 is coupled to the second bushing 570, the lower body 574 may be seated on the flange 565 of the second hinge pin 560.

Meanwhile, the main door 30 may include a portion or all of the front frame 310, the door liner 320, and the connection frame 330 connecting the front frame 310 and the door liner 320. Alternatively, the connection frame 330 may be omitted, and the front frame 310 and the door liner 320 may be directly connected.

The front frame 310 may include a bracket coupling portion 312 to which the door coupling bracket 552 is coupled. The bracket coupling portion 312 may be formed in a recessed shape. Accordingly, the door coupling bracket 552 may be accommodated in the bracket coupling portion 312.

A fastening hole corresponding to the fastening hole of the door fastening bracket 552 may be provided in the bracket coupling portion 312.

To increase the coupling force with the door coupling bracket 552, a fastening plate 590 may be provided on the opposite side of the door coupling bracket 552 in the front frame. The fastening plate 590 may include a vertical extension portion 592 and a horizontal extension portion 594 bent and extended from the vertical extension portion 592. Of course, the horizontal extension portion 594 may be omitted.

A fastening hole 593 corresponding to the fastening hole of the bracket coupling portion 312 may be formed in the vertical extension portion 592. Accordingly, the fastening member may pass through the fastening hole of the door coupling bracket 552, the fastening hole of the bracket coupling portion 312, and the fastening hole 593 of the vertical extension portion 592. Of course, the fastening plate 590 may be omitted.

The sub door 40 may include a portion or all of a front frame 410, a door frame 420 coupled to the front frame 410, and a door liner 430 coupled to the door frame 420.

A front panel 450 may be detachably coupled to the front surface of the front frame 421. The front panel 450 may be formed of, for example, a glass material. In this case, the front panel 450 may form the outer appearance of the front surface of the sub door 40. As another example, the front panel 450 may be omitted. In this case, the front frame 410 may form the outer appearance of the front surface of the sub door 40.

The door frame 420 may include a stopper coupling portion 422 to which a stopper 580 is coupled. The stopper coupling portion 422 may be formed in a recessed shape. For example, the stopper coupling portion 422 may be provided on a lower surface of the door frame 420.

The first portion 582 of the stopper 580 may be accommodated in the stopper coupling portion 422. One or more fastening holes 423 may be provided in the stopper coupling portion 422. Although not limited, a plurality of fastening holes 423 may be spaced apart in a horizontal direction to enhance coupling force.

The door frame 420 may include a hinge coupling portion 424. For example, the hinge coupling portion 424 may be formed as the lower surface of the door frame 420 is recessed toward the upper side.

For example, the second bushing 570 may be coupled to the hinge coupling portion 424.

The hinge coupling portion 424 may include a first accommodation portion 425 having a first space and a second accommodation portion 426 extending downward from the first accommodation portion 425 and having a second space.

An inner diameter of the second accommodation portion 426 may be larger than an inner diameter of the first accommodation portion 425.

The upper body 572 of the second bushing 570 may be accommodated in the first accommodation portion 425. The lower body 574 of the second bushing 570 may be accommodated in the second accommodation portion 426.

The inner diameter of the first accommodation portion 425 may be greater than the inner diameter of the upper body 572 and may be smaller than the length from the center of the upper body 572 in the radial direction to the coupling rib 572*a*.

In a state in which the second bushing 570 is coupled to the hinge coupling portion 424, when the sub door 40 rotates, the hinge coupling portion 424 and the second bushing 570 together may rotate about the hinge pin 560.

The hinge coupling portion 424 may further include a flange accommodation groove 427 accommodating the flange 575 of the second bushing 570.

The assembly process of the hinge mechanism 50 will be briefly described.

A second bushing 570 may be coupled to the hinge coupling portion 424 of the sub door 40.

The second hinge pin 560 may be coupled to the fixing bracket 550. In this state, when the fixing bracket 550 is fixed to the main door 30 and the second hinge pin 560 is inserted into the second bushing 570, the main door 30 and the sub door 40 may be connected.

The first bushing 540 may be coupled to the second hinge pin 560. The first hinge pin 530 may be coupled to the hinge bracket 510.

When the hinge bracket 510 is fixed to the front surface of the cabinet 10 and the first hinge pin 530 is inserted into the first bushing 540, assembly of the hinge mechanism 50 may be completed.

Figure 11:
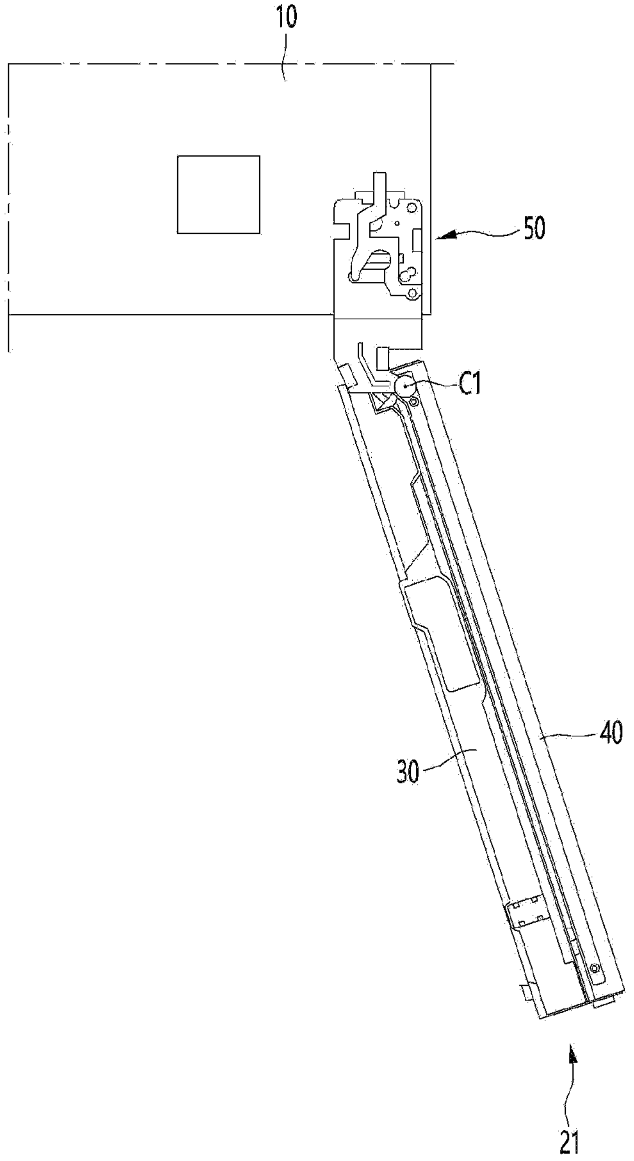
FIG. 11 is a view illustrating a state where the main door and the sub door rotate together.
Figure 12:
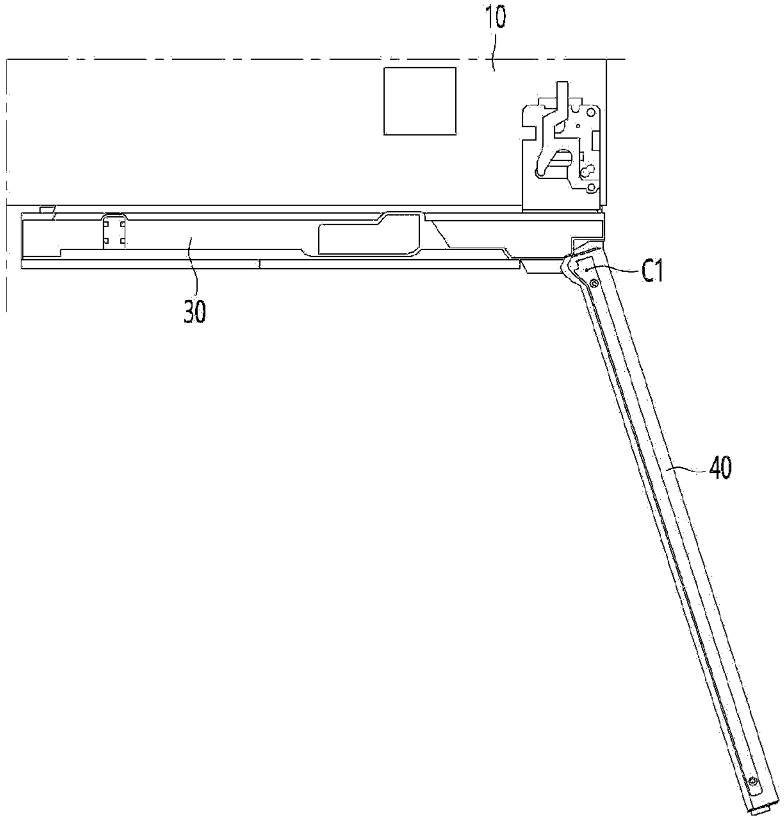
FIG. 12 is a view illustrating a state where the sub door rotates in a state in which the main door is closed.

FIG. 11 is a view illustrating a state where the main door and the sub door rotate together, and FIG. 12 is a view illustrating a state where the sub door rotates in a state in which the main door is closed.

Referring to FIG. 11, when the main door 30 is opened, the sub door 40 may rotate together with the main door 30. The main door 30 may rotate based on the rotation center C1. Since the rotation center C is located at the sub door 40 as described above, the distance between the front surface of the sub door 40 and the rotation center C is reduced, thereby, during the rotation of the main door 30, the possibility of the sub door 40 colliding with surrounding structures may be reduced.

In addition, even if the thickness of the main door 30 is reduced, when the rotation centers C1 of the main door 30 and the sub door 40 are located on the sub door 40, while rotation of the main door 30 is possible, during the rotation process of the main door 30, the possibility that the sub door 40 collides with surrounding structures may be reduced.

Referring to FIG. 12, in a state in which the main door 30 is closed, the sub door 40 may rotate about the rotation center C. Since the rotation center C of the sub door 40 is located on the sub door 40, the possibility of the sub door 40 colliding with surrounding structures during the rotation of the sub door 40 can be reduced.

When the refrigerator is accommodated in a furniture closet, if the overall thickness of the door 21 is reduced, the length of the door 21 protruding from the front surface of the furniture closet may be reduced.

Although not limited, when the total thickness of the door 21 is 55 mm or less, the front surface of the door 21 may be prevented from protruding from the front surface of the furniture closet. While the door 21 having this thickness includes the main door 30 and the sub door 40, the rotation center C1 may be located in the sub door 40.

When the rotation center C is located in the sub door 40, the distance from the rotation center C to the front surface of the sub door 40 may be within a range of 13 mm to 15 mm. In this case, an adiabatic space may be formed between the front surface of the sub door 40 and the rotation center C.

The invention claimed is:

1. A refrigerator comprising:
a cabinet having a storage space;
a hinge mechanism coupled to the cabinet;
a main door coupled to the hinge mechanism to be rotatable with respect to the cabinet to open and close the storage space; and
a sub door coupled to the hinge mechanism to be rotatable with respect to the main door,
wherein:
the hinge mechanism is positioned to support lower sides of the main door and the sub door,
a rotation axis of the main door and a rotation axis of the sub door extend into the sub door,
the hinge mechanism includes:
a hinge bracket coupled to the cabinet;
a first hinge pin coupled to the hinge bracket and providing the rotation axis of the main door;
a fixing bracket coupled to the main door:
a second hinge pin coupled to the fixing bracket and providing the rotation axis of the sub door;
a first bushing that is rotatable with respect to the first hinge pin; and
a second bushing that is rotatable with respect to the second hinge pin, and
at least a portion of the first bushing and at least a portion of the first hinge pin are accommodated in the second hinge pin.

2. The refrigerator of claim 1,
wherein the rotation axis of the main door coincides with the rotation axis of the sub door.

3. The refrigerator of claim 1, further comprising:
an auto closing device coupled to the main door and including an elastic member providing a closing force to the main door during opening and closing of the main door.

4. The refrigerator of claim 3,
wherein the auto closing device further includes:
a body coupled to the main door and configured to accommodate the elastic member, and
a lever connected to the elastic member and rotating with respect to the body about a rotation axis, and
wherein the hinge bracket has a contact surface that contacts the lever during opening and closing of the main door.

5. The refrigerator of claim 4,
wherein, when the main door is closed, the rotation axis of the main door is located closer to a front surface of the sub door than the rotation axis of the lever.

6. The refrigerator of claim 5,
wherein, when the main door is closed, a surface of the lever contacting the contact surface of the hinge bracket is located closer to a rear surface of the main door than the rotation axis of the lever.

7. The refrigerator of claim 5,
wherein a sum of thicknesses of the main door and the sub door is less than a distance between the rotation axis of the main door and the rotation axis of the lever when the main door and the sub door are closed.

8. The refrigerator of claim 1,
wherein the first hinge pin and the second hinge pin are vertically aligned, and the second hinge pin is located above the first hinge pin.

9. The refrigerator of claim 8,
wherein at least a portion of the first hinge pin is accommodated inside an opening of the second hinge pin.

10. The refrigerator of claim 1,
wherein the hinge bracket includes a first opening to which the first hinge pin is coupled,
wherein the fixing bracket includes a second opening to which the second hinge pin is coupled, and
wherein the first opening and the second opening are aligned in a vertical direction.

11. The refrigerator of claim 10,
wherein the first hinge pin includes a first shaft accommodated in the first bushing.

12. The refrigerator of claim 1,
wherein
the second hinge pin includes a second shaft and a pin body tube extending downward from the second shaft,
at least a portion of the first bushing is fixedly accommodated in the pin body tube, and
at least a portion of the first shaft is located in the pin body tube and accommodated in the first bushing.

13. The refrigerator of claim 12,
wherein the second bushing includes an upper body section accommodating at least a portion of the second shaft and a lower body section accommodating at least a portion of the pin body tube.

14. The refrigerator of claim 1,
wherein the sub door includes a hinge coupling opening that accommodates the second bushing,
wherein at least a portion of the second hinge pin is located in the hinge coupling opening and accommodated in the second bushing, and
wherein at least a portion of the first hinge pin is located inside the second hinge pin and inside the hinge coupling opening.

15. The refrigerator of claim 1,
wherein the second bushing is fixed to the sub door, and the first bushing is fixed to the second hinge pin,
wherein while the main door rotates, the fixing bracket, the second bushing, the second hinge pin, and the first bushing rotate together, and
wherein the first bushing rotates relative to the first hinge pin.

16. The refrigerator of claim 15,
wherein, while the sub door rotates, the second bushing rotates together with the sub door, and
wherein the second bushing rotates relative to the second hinge pin.

17. The refrigerator of claim 1,
wherein the hinge bracket includes:
a coupling plate coupled to a front surface of the cabinet; and
a bracket body plate extending from the coupling plate in a horizontal direction and to which the first hinge pin is coupled;
wherein the bracket body plate includes a first stopping surface region and a second stopping surface region that are horizontally spaced apart, and
wherein the sub door includes a stopper wall that contacts at least one of the first stopping surface region or the second stopping surface region during rotation of the sub door.

18. The refrigerator of claim 1, wherein the fixing bracket includes:

a door coupling bracket coupled to the main door and extending in a vertical direction;

an extension bracket extending from the door coupling bracket at a predetermined angle to be inclined relative to a horizontal direction; and a support bracket extending in the horizontal direction from the extension bracket and to which the second hinge pin is coupled.

19. A refrigerator comprising:

a cabinet having a storage space;

a hinge mechanism coupled to the cabinet;

a main door coupled to the hinge mechanism to be rotatable with respect to the cabinet to open and close the storage space; and a sub door coupled to the hinge mechanism to be rotatable with respect to the main door, wherein:

the hinge mechanism is positioned to support lower sides of the main door and the sub door, a rotation axis of the main door and a rotation axis of the sub door extend into the sub door, the hinge mechanism includes:

a hinge bracket coupled to the cabinet;

a first hinge pin coupled to the hinge bracket and providing the rotation axis of the main door;

a fixing bracket coupled to the main door;

a second hinge pin coupled to the fixing bracket and providing the rotation axis of the sub door;

a first bushing that is rotatable with respect to the first hinge pin; and a second bushing that is rotatable with respect to the second hinge pin, the second hinge pin includes a second shaft and a pin body tube extending downward from the second shaft, the first bushing is fixedly accommodated in the pin body tube the first hinge pin includes a first shaft, and at least a portion of the first shaft is located in the pin body tube and accommodated in the first bushing.

20. A refrigerator comprising:

a cabinet having a storage space;

a hinge mechanism coupled to the cabinet;

a main door coupled to the hinge mechanism to be rotatable with respect to the cabinet to open and close the storage space; and a sub door coupled to the hinge mechanism to be rotatable with respect to the main door, wherein:

the hinge mechanism is positioned to support lower sides of the main door and the sub door, a rotation axis of the main door and a rotation axis of the sub door extend into the sub door, the hinge mechanism includes:

a hinge bracket coupled to the cabinet;

a first hinge pin coupled to the hinge bracket and providing the rotation axis of the main door;

a fixing bracket coupled to the main door;

a second hinge pin coupled to the fixing bracket and providing the rotation axis of the sub door;

a first bushing that is rotatable with respect to the first hinge pin; and a second bushing that is rotatable with respect to the second hinge pin, the second bushing is fixed to the sub door, and the first bushing is fixed to the second hinge pin, while the main door rotates, the fixing bracket, the second bushing, the second hinge pin, and the first bushing rotate together, and the first bushing rotates relative to the first hinge pin.

* * * * *